(12) United States Patent
Nikam et al.

(10) Patent No.: US 12,498,053 B2
(45) Date of Patent: Dec. 16, 2025

(54) WEDGE TORQUE ASSEMBLY

(71) Applicant: Crane ChemPharma & Energy Corp., The Woodlands, TX (US)

(72) Inventors: Pankaj Nikam, Pune (IN); Ranjit Narayan Bhalkar, Pune (IN); Ratnadeep Panaskar, Pune (IN); Amitkumar Patil, Kate Wasti (IN); Samson Kay, Cincinnati, OH (US); Kaustubh Dharwadkar, San Jose, CA (US)

(73) Assignee: Crane ChemPharma & Energy Corp., The Woodlands, TX (US)

( * ) Notice: Subject to any disclaimer, the term of this patent is extended or adjusted under 35 U.S.C. 154(b) by 129 days.

(21) Appl. No.: 18/557,894

(22) PCT Filed: Apr. 28, 2022

(86) PCT No.: PCT/US2022/071985
§ 371 (c)(1),
(2) Date: Oct. 27, 2023

(87) PCT Pub. No.: WO2022/232818
PCT Pub. Date: Nov. 3, 2022

(65) Prior Publication Data
US 2024/0280184 A1    Aug. 22, 2024

Related U.S. Application Data

(60) Provisional application No. 63/181,003, filed on Apr. 28, 2021.

(51) Int. Cl.
*F16K 31/04* (2006.01)
*F16K 31/50* (2006.01)
*F16K 31/524* (2006.01)

(52) U.S. Cl.
CPC .......... *F16K 31/043* (2013.01); *F16K 31/50* (2013.01); *F16K 31/52458* (2013.01)

(58) Field of Classification Search
CPC .. F16K 31/043; F16K 31/502; F16K 31/5284; F16K 5/163; F16K 5/222
See application file for complete search history.

(56) References Cited

U.S. PATENT DOCUMENTS 2,412,529 A    12/1946   Mueller
3,046,802 A *   7/1962   Cupedo ............... F16K 31/5286
                                                        251/162

(Continued)

FOREIGN PATENT DOCUMENTS

EP    1160493 A1    12/2001
JP    S611766 U     1/1986

(Continued)

OTHER PUBLICATIONS

Translation of NL 1034069 (Year: 2007).*

(Continued)

*Primary Examiner* — Umashankar Venkatesan

(57) ABSTRACT

An apparatus includes a valve yoke comprising a hollow inner portion and an upper face, an adapter plate including a through-hole and a lower face, wherein the lower face provides an interface for connection to the upper face of the valve yoke, an actuator assembly having an exterior profile, wherein the actuator assembly is removably retained within the hollow inner portion, and a drive screw retained between the actuator assembly and the adapter plate. The drive screw is rotatable within the through-hole along an axis of rotation. The axis of rotation is parallel to an axis of reciprocation. The actuator assembly comprises a first axial cam and a first indexing pin rotatably driven by the drive screw to follow the first axial cam.

16 Claims, 4 Drawing Sheets

(56) References Cited

U.S. PATENT DOCUMENTS

| | | | |
|---|---|---|---|
| 3,184,214 A | | 5/1965 | King |
| 4,293,117 A | * | 10/1981 | Mueller ............... F16K 31/5284 74/57 |
| 4,541,295 A | | 9/1985 | Cove |
| 6,276,394 B1 | * | 8/2001 | Smith ................ F16K 31/5284 251/56 |
| 10,161,490 B2 | * | 12/2018 | Stoll ........................ H02K 7/06 |
| 10,190,700 B2 | * | 1/2019 | Justl ..................... F15B 15/068 |
| 2008/0203338 A1 | * | 8/2008 | Roundy ............. F16K 31/5282 251/63.6 |
| 2013/0043420 A1 | | 2/2013 | Case et al. |
| 2017/0291489 A1 | * | 10/2017 | Jacksteit ............ B01D 17/0214 |
| 2017/0350525 A1 | | 12/2017 | Scaramucci et al. |
| 2019/0249786 A1 | | 8/2019 | Bell |

FOREIGN PATENT DOCUMENTS

| | | | | |
|---|---|---|---|---|
| KR | 10-0986198 B1 | | 10/2010 | |
| NL | 1034069 C2 | * | 6/2007 | ............. F16K 5/163 |

OTHER PUBLICATIONS

Supplementary European Search Report dated Apr. 30, 2025, in connection with European Patent Application No. 22796979.7, 11 pages.

International Search Report and Written Opinion of the International Searching Authority, dated Jul. 6, 2022, in connection with International Application No. PCT/US2022/071985, 8 pages.

* cited by examiner

WEDGE TORQUE ASSEMBLY

CROSS-REFERENCE TO RELATED APPLICATIONS

This application is a 371 National Stage of International Application No. PCT/US2022/071985, filed Apr. 28, 2022, which claims priority to U.S. Provisional Patent Application No. 63/181,003, filed Apr. 28, 2021, the disclosures of which are incorporated herein by reference.

TECHNICAL FIELD

The present disclosure relates to fluid flow control. More specifically, this disclosure relates to wedge torque assembly for actuating a valve.

BACKGROUND

Plug valves, which control the passage of fluids through the passageway of a valve body by rotating a ported plug between a wide open position and a fully closed position, are for certain applications, the preferred solution for controlling the passage of certain challenging flow media. While popular for many applications, rising stem valves, wherein a wedge moves between open and closed states by being lifting from or lowered into a valve seat through numerous rotations of an actuator (for example, a threaded drive shaft) relative to a fixed thread can be unsuitable for certain flow media. In some media, the numerous threads used to convert rotation motion into reciprocal motion in a rising stem valve can be vulnerable to being jammed or otherwise prevented from rotating by the medium. Accordingly, for such challenging flow media, it is often advantageous to use a valve which is actuated through the application of a large torque over a short angular throw.

However, achieving high-torque/short-throw actuation of the ported plug of a plug valve presents unique technical challenges and opportunities for improvement in the art, particularly as the mass of the valve plug and/or the expected actuation torque increases. For example, certain existing solutions utilize ball bearings to facilitate the rotational motion of a valve plug in response to an applied torque. Such solutions are problematic in at least two regards. First, the bearings can go out of round in response to the forces generated by the mass of the valve plug and rotation torque. Second, such solutions can require that the ball bearings be individually packed and configured for each installation, which increases the installation time, and impedes rapid repair or replacement of components. In practical terms, the challenges of installing and repairing such bearing-based systems can translate unwanted down time for users.

In view of the above, improving the modularity and durability of high-torque, short angular throw actuators for plug valves remains a source of technical challenges and opportunities for improvement in the art.

SUMMARY

The present disclosure illustrates embodiments of a wedge torque assembly for actuating the plug of a plug valve.

In a first embodiment, an apparatus includes a valve yoke comprising a hollow inner portion and an upper face, an adapter plate including a through-hole and a lower face, wherein the lower face provides an interface for connection to the upper face of the valve yoke, an actuator assembly having an exterior profile, wherein the actuator assembly is removably retained within the hollow inner portion, and a drive screw retained between the actuator assembly and the adapter plate. The drive screw is rotatable within the through-hole along an axis of rotation. The axis of rotation is parallel to an axis of reciprocation. The actuator assembly comprises a first axial cam and a first indexing pin rotatably driven by the drive screw to follow the first axial cam.

In a second embodiment, an actuator assembly includes a cam body having a hollow body with a cylindrical interior profile, and a first recess defining a first axial cam, an indexing nut retained within the cam body, wherein the indexing nut includes an inner portion proportioned to retain a valve plug, and wherein the indexing nut is rotatable along an axis of rotation of the valve plug and free to reciprocate along an axis of reciprocation and an indexing pin attached to the indexing nut, wherein the indexing pin follows a profile of the first axial cam upon rotation of the indexing nut around the axis of rotation.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
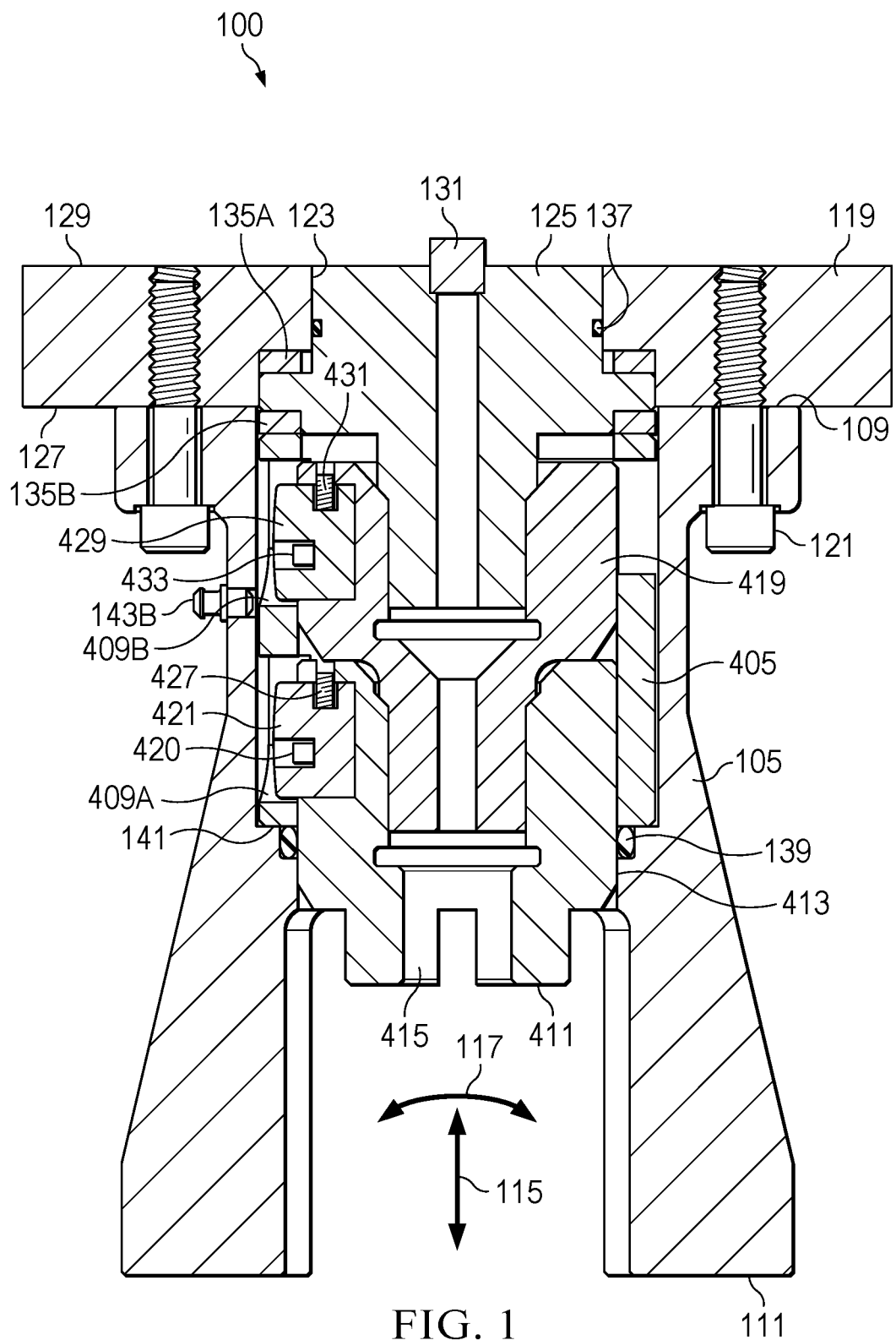
FIG. 1 illustrates a first view of an apparatus providing wedge torque actuation of a valve plug according to various embodiments of this disclosure.

By way of background, certain flow media contain interferents (for example, particulate matter) or have material properties (for example, ongoing chemical reactions causing the molecules of the material to cross-link and become cementitious), which, even in minute quantities, can lock the threads of a screw. Accordingly, rising stem valves and other valves which use actuators which rely on rotatably driving a threaded shaft relative to a nut or other fixed thread over multiple rotations relative to the fixed thread can be unsuitable for certain flow media. For controlling the flow of such problematic media, a plug valve, comprising a ported plug which can be rotated between an open position and a closed position along a relative short throw (for example, a quarter turn) can avoid the problems of galling, binding or clogging of the actuator which arise when using rising stem valves with challenging flow media.

Referring to the illustrative examples of FIGS. 1-4, an example of an apparatus 100 and an actuator assembly 400 for providing wedge torque actuation of a plug valve according to certain embodiments of this disclosure is shown in the figures.

According to certain embodiments, apparatus 100 comprises a valve yoke 105, comprising a cast and/or machined body having a hollow inner portion 107, an upper face 109 and a lower face 111. In some embodiments, hollow inner portion 107 comprises a cavity within valve yoke 105 which retains actuator assembly 400, which in turn retains the valve plug of a plug valve. As shown the illustrative example of FIGS. 2 and 3, valve yoke 105 is tapped or drilled to allow the passage of one or more locking bolts 113 to prevent rotation of the actuator relative to the yoke. In this way, valve yoke 105 provides a stable platform by which the actuator assembly 400 can apply both lifting forces to the valve plug along an axis of reciprocation 115, and rotational forces 117 along an axis of rotation parallel to axis of reciprocation 115.

In various embodiments according to this disclosure, lower face 111 valve yoke 105 connects, either directly (i.e., face-to-face) or indirectly (with a gasket or other sealing member in between) to a companion face of a valve body (not shown) through which the fluid medium flows under the control of the valve plug. Similarly, upper face of 109 of valve yoke 105 connects either directly, or indirectly (i.e., with one or more seals disposed in the interface between the two bodies) with adapter plate 119. In some embodiments, adapter plate 119 attaches to valve yoke 105 through a plurality of anchor bolts 121, which provide both a sealing force normal to upper face 109 (i.e., to prevent the passage of media in or out of the valve along the interface between valve yoke 105 and adapter plate 119) as well as a shear force resisting rotational movement of adapter plate 119 relative to valve yoke 105.

Figure 2:
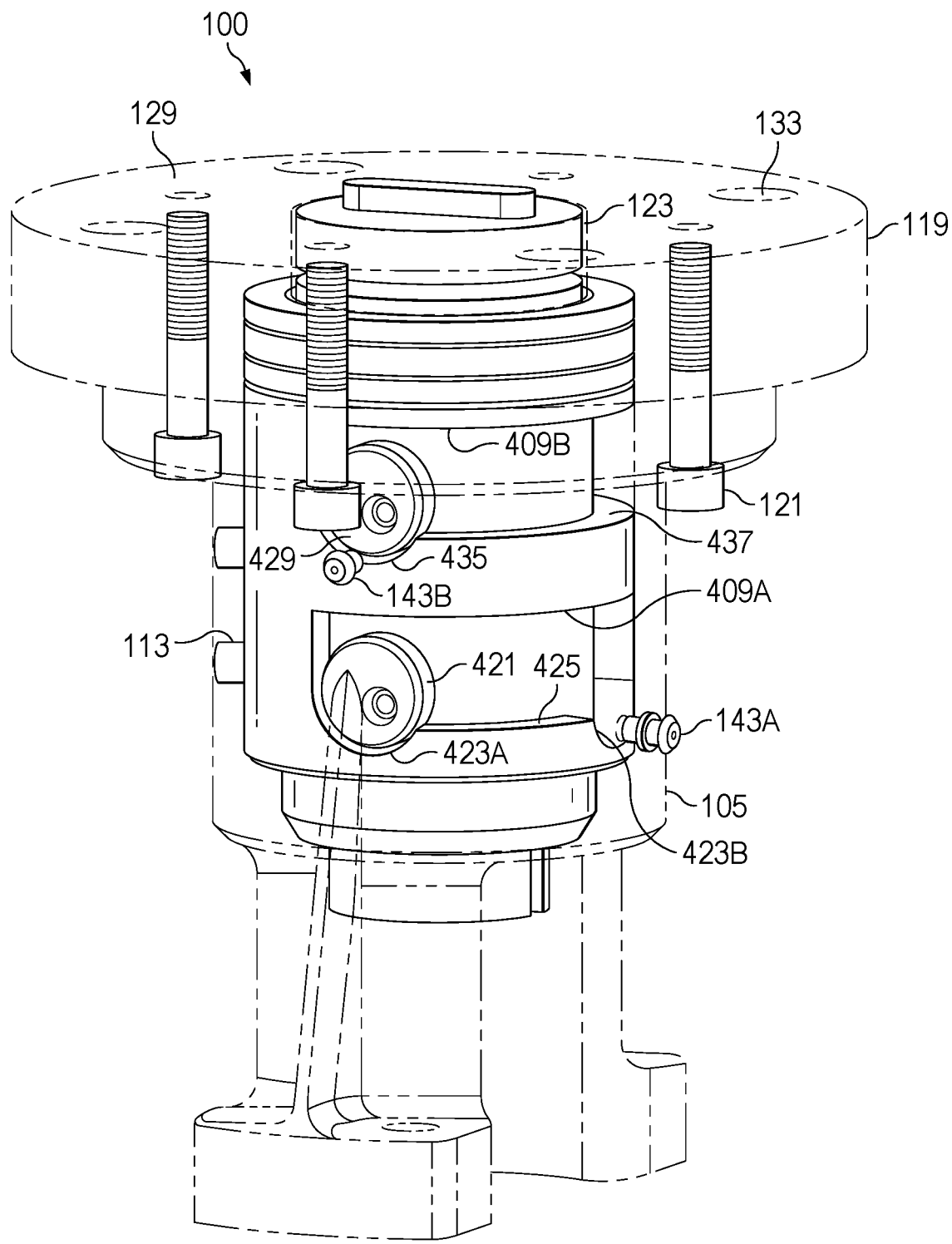
FIG. 2 illustrates a second view of an apparatus providing wedge torque actuation of a valve plug according to certain embodiments of this disclosure.
Figure 3:
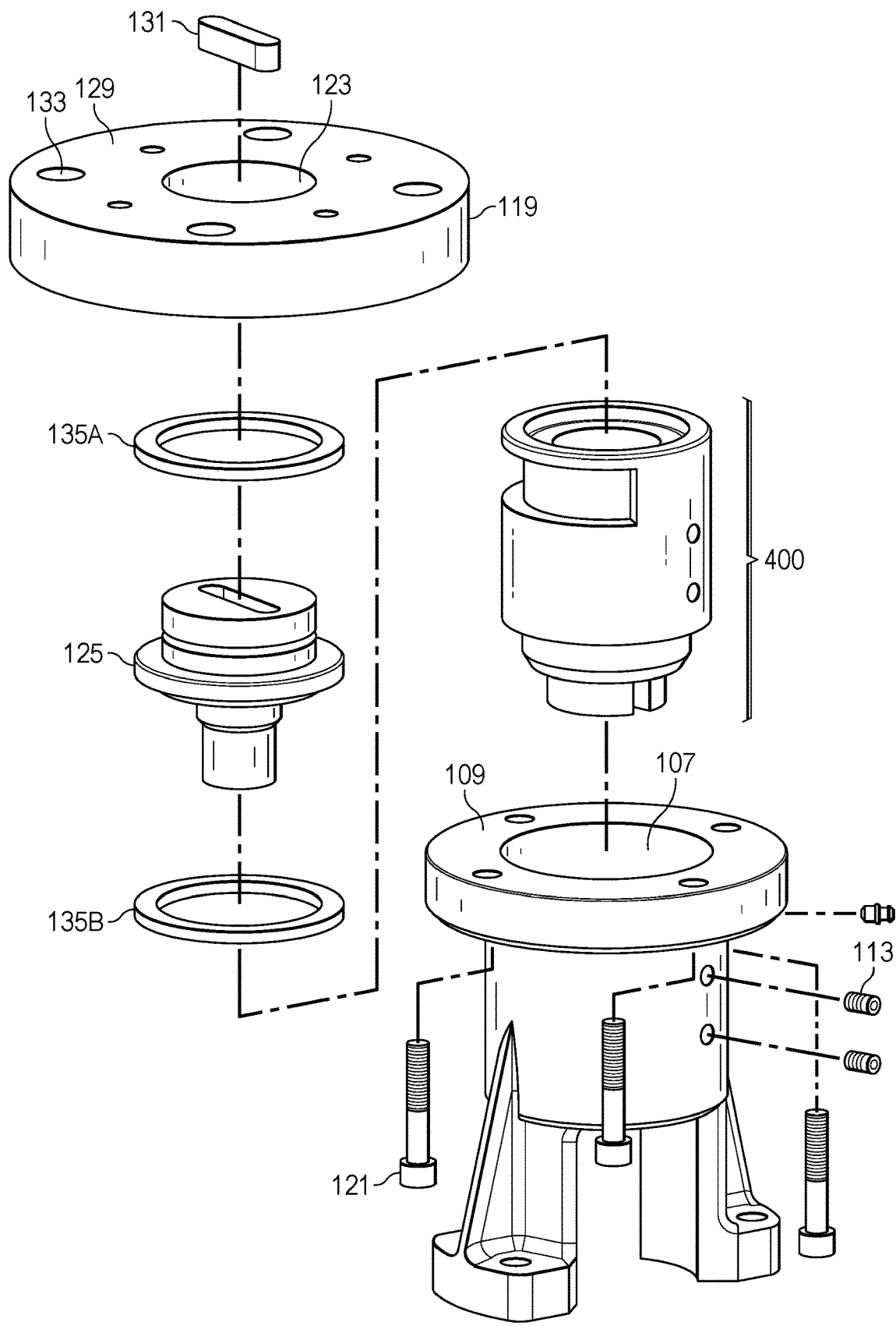
FIG. 3 illustrates an exploded view of an apparatus providing wedge torque actuation of a valve plug according to some embodiments of this disclosure.

As shown in the non-limiting examples of FIGS. 1-3, adapter plate 119 comprises a through-hole 123 exposing at least a portion of a drive screw 125. Adapter plate 119 further comprises a lower face 127 providing a mating surface to upper face 109 of valve yoke 105. According to some embodiments, adapter plate 119 comprises an upper face 129 for anchoring a drive motor (not shown) providing a rotational drive force to drive screw 125. In certain embodiments, the rotational drive force from the drive motor is provided to drive screw 125 through a drive key 131. According to various embodiments, adapter plate 119 comprises one or more anchor points 133 for attaching the drive motor. In some embodiments, anchor points 133 comprise through-holes in adapter plate 119, through which anchor bolts can pass through. In certain embodiments, anchor points 133 comprises threaded studs extending up from upper face 129.

In some embodiments, drive screw 125 is retained between adapter plate 119 and an actuator assembly 400 such that drive screw 125 is rotatable within through-hole 123 along an axis of rotation parallel to axis of reciprocation 115. As shown in the non-limiting example of FIG. 1, drive screw 125 sits between one or more thrust washers 135A and 135B to facilitate rotational movement of the drive screw relative to a cam body 405 of actuator assembly 400. In various embodiments, one or more upper seals 137 is disposed along the interface between drive screw 125 and through-hole 123 to prevent the passage of media in or out of apparatus 100.

As noted previously, drive screw 125 is retained between adapter plate 119 and actuator assembly 400, such that drive screw 125 is rotatable within through-hole 123. According to certain embodiments, actuator assembly 400 comprises a cam body 405 which defines at least part of an exterior profile of the actuator assembly 400 and is proportioned to fit inside the hollow portion 107 of the valve yoke 105. As shown in the non-limiting example of FIG. 4, cam body comprises an exterior profile proportioned to fit inside hollow portion 107 of the valve yoke 105, and a substantially smooth, cylindrical inner profile 407 to facilitate both reciprocal and rotational movement along the face of inner profile 407. Further, cam body 405 comprises one or more recesses 409A and 409B, which define first and second axial cams.

According to various embodiments, actuator assembly 400 comprises an indexing nut 411, wherein indexing nut 411 comprises a substantially cylindrical exterior surface which is proportioned to be rotatable within cam body 405, and also free to move up and down within cam body 405 along axis of reciprocation 115. Further, indexing nut 411 comprises a first interior portion 415 configured to retain the valve plug of the plug valve in a fixed position (i.e., the valve plug cannot move along either the axis of rotation or rotationally) relative to indexing nut 411. In some embodiments, indexing nut 411 comprises a second interior portion 417 containing screw threads or other engagement surfaces (for example, internal corners grub screws) for engaging indexing nut 411 with a lower portion of an intermediate nut 419.

Figure 4:
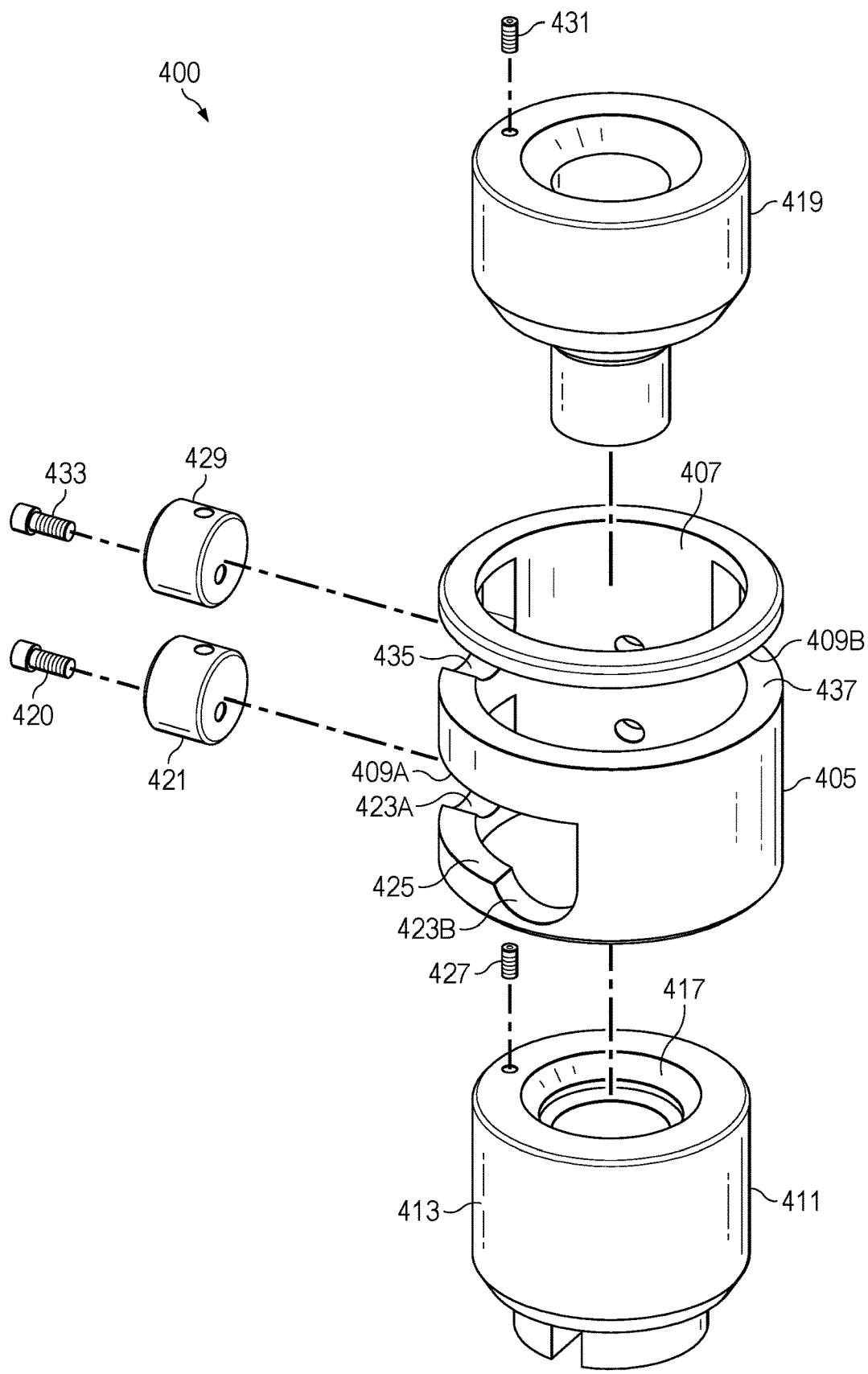
FIG. 4 illustrates an exploded view of an actuator assembly for providing wedge torque actuation of a valve plug according to some embodiments of this disclosure.

As shown in the explanatory example of FIG. 4, a first indexing pin 421 attaches to exterior surface 413 of indexing nut 411. According to certain embodiments, first indexing pin 421 is attached to indexing nut 411 by a first indexing pin bolt 420 passing through a through-hole in first indexing pin 421 which is slightly offset from an axis of radial symmetry of first indexing pin 421. In some embodiments, slight eccentricity in the position of first indexing pin bolt 420 relative to first indexing pin 421 may advantageously provide wiggle room to facilitate adjustment and proper engagement with first recess 409A. In some embodiments, such as shown in FIG. 4, first indexing pin 421 is further retained by a retaining bolt 427 which passes through indexing nut 411 to engage with a hole on the side of first indexing pin 421. According to certain embodiments, first recess 409A comprises a through-hole in cam body 405, the lower surface of which defines an axial cam which first indexing pin 421 follows over the rotational throw of the actuator assembly 400.

According to various embodiments, the lower surface of first recess 409 comprises a first indexing stop 423A at the beginning of the rotational throw of actuator assembly 400 and a second indexing stop 423B at the end of the rotational throw of actuator assembly 400. The lower surface of first recess 409A further comprises a flat land 425 along the portions of the rotational throw of actuator assembly 400 between first indexing stop 423A and second indexing stop 423B. As shown in the figures, the bottoms of first indexing stop 423A and second indexing stop 423B are slightly lower than the surface of flat land 425. In practical terms, this means that, when a torque is applied to indexing nut 411 (for example, a torque in the direction from first indexing stop 423A to second indexing stop 423B), first indexing pin 421 follows the bottom of first recess 409 by initially rising up the ramped surface of first indexing stop 423A to flat land 425, which causes indexing nut 411 to move slightly upwards along axis of reciprocation 115, moving along flat land 425, and then dropping into second indexing stop 423B. The slight reciprocal motion of indexing nut 411 in response to first indexing pin 421 moving in and out of first and second indexing stops 423A and 423B provides at least the following technical benefits. First, because first and second indexing stops 423A and 423B are slightly below flat land 425, the weight of the valve plug keeps the valve in the desired position, without any further input provided by the drive motor. Second, the slight upward movement of the valve plug caused by first indexing pin 421 following the axial cam of the lower surface of first recess 409A can reduce rotational stiction in the system, thereby reducing the rotational force required to move the valve between its open and closed positions. While in the example of FIGS. 1-4, first recess 409A is associated with a rotational drive path (i.e., rotational throw) of 90 degrees, other embodiments, wherein the valve plug or valve body to which apparatus 100 is connected, have different geometries and/or multiple flow paths supporting longer or shorter rotational drive paths are possible, and within the contemplated scope of this disclosure.

According to certain embodiments, at least part of indexing nut 411 extends below cam body 405 within hollow portion 107 of valve yoke 105. Further, in some embodiments, a lower seal 139 is disposed between lower shoulder 141 of valve yoke 105 supporting cam body 405 and a portion of indexing nut 411 extending below cam body 405. In various embodiments, lower seal 139 blocks the passage of material between actuator assembly 400 and valve yoke 105.

Referring to the non-limiting example of FIGS. 1-4, in some embodiments, actuator assembly 400 further comprises an intermediate nut 419. According to various embodiments, intermediate nut 419 is retained between drive screw 125 and indexing nut 411 such that drive screw 125, indexing nut 411 and intermediate nut 419 rotate together in response to a rotational force applied through drive screw 125. However, according to some embodiments, intermediate nut 419 can move reciprocally relative to one or both of drive screw 125 and/or indexing nut 411. According to various embodiments, a second indexing pin 429 attaches to an exterior surface of intermediate nut 419. In some embodiments, recesses for retaining pins are provided in one or both of intermediate nut 419 and indexing nut 411 to accommodate retaining bolts 431 and 427. According to various embodiments, second indexing pin 429 is further secured to intermediate nut 419 by mounting bolt 433.

According to various embodiments, second recess 409B has a lower surface defining a second axial cam, which is followed by second indexing pin 429 across the rotational drive path of the actuator. Depending on embodiments, the lower surface of second recess 409B differs from that of the lower surface of first recess 408A. For example, in some embodiments, the lower surface of second recess 409B may only comprise a single upper indexing stop 435. Additionally, in some embodiments, upper flat land 437 may cover a larger angular area and indexing stop 435. By changing the geometry of the lower surface of second recess 408B relative to that of first recess 408A, it is possible to tune parameters such as the indexing force provided by the weight of the valve plug, as well as facilitate assembly/disassembly of actuator assembly 400.

In certain embodiments according to this disclosure, valve yoke 105 comprises one or more grease fittings 143A-B, which comprise closable passages through valve yoke 105 to first recess 409A and second recess 409B, through which grease or other lubricants can be applied to the moving surfaces of actuator assembly 400.

Because actuator assembly 400 is, in some embodiments, a single assembly retained within valve yoke 105, it is possible to easily swap out actuator units for repair and replacement, thereby reducing repair-related downtime. Further, embodiments according to the present design provide a high degree of modularity, wherein the same actuator mechanism can be mixed and matched with different drive screws, valve yokes and adapter plates, thereby facilitating retrofitting and upgrades. Additionally, in contrast to plug valve actuation systems utilizing ball bearings, the lubricated axial cams and thrust washers utilized by certain embodiments according to this disclosure are simple and structurally robust.

Examples of apparatus according to this disclosure include apparatus comprising a valve yoke comprising a hollow inner portion and an upper face; an adapter plate comprising a through-hole and a lower face, wherein the lower face provides an interface for connection to the upper face of the valve yoke; an actuator assembly having an exterior profile, wherein the actuator assembly is removably retained within the hollow inner portion; and a drive screw retained between the actuator assembly and the adapter plate, wherein the drive screw is rotatable within the through-hole along an axis of rotation, wherein the axis of rotation is parallel to an axis of reciprocation, wherein the actuator assembly comprises a first axial cam and a first indexing pin rotatably driven by the drive screw to follow the first axial cam.

Examples of apparatus according to this disclosure include apparatus, wherein the actuator assembly comprises an indexing nut for retaining a valve plug, wherein the indexing nut is driven by the drive screw and rotatable along the axis of rotation and able to reciprocate along the axis of reciprocation; and a cam body retaining the indexing nut in an inner portion of the cam body, the cam body comprising a first recess defining the first axial cam, wherein the first indexing pin is removably attached to an exterior surface of the indexing nut.

Examples of apparatus according to this disclosure include apparatus wherein the first recess defining the first axial cam covers a rotational drive path of less than 180 degrees.

Examples of apparatus according to this disclosure include apparatus wherein the first recess defining the first axial cam covers a rotational drive path of less than 100 degrees.

Examples of apparatus according to this disclosure include apparatus wherein the first recess defining the first axial cam comprises a flat land disposed between a first indexing stop and a second indexing stop.

Examples of apparatus according to this disclosure include apparatus wherein the actuator assembly further comprises an intermediate nut comprising a lower portion detachably connected to the indexing nut and an upper portion detachably connected to the drive screw, wherein the intermediate nut is rotatable along the axis of rotation and reciprocally along the axis of reciprocation; and a second indexing pin removably attached to an exterior surface of the intermediate nut, wherein the cam body further comprises a second recess defining a second axial cam.

Examples of apparatus according to this disclosure include apparatus wherein the valve yoke comprises a grease fitting, the grease fitting providing a closable passage through the valve yoke to the first recess defining the first axial cam.

Examples of apparatus according to this disclosure include apparatus comprising a thrust washer disposed between the drive screw and the actuator assembly.

Examples of apparatus according to this disclosure include apparatus wherein the drive screw comprises a key slot for engaging with a drive shaft, and wherein the adapter plate further comprises a mount point for a motor driving the drive shaft.

Examples of apparatus according to this disclosure include apparatus comprising at least one locking bolt blocking the actuator assembly from rotating relative to the valve yoke.

Examples of actuator assemblies according to this disclosure include actuator assemblies comprising a cam body comprising a hollow body with a cylindrical interior profile, and a first recess defining a first axial cam; an indexing nut retained within the cam body, wherein the indexing nut comprises an inner portion proportioned to retain a valve plug, and wherein the indexing nut is rotatable along an axis of rotation of the valve plug and free to reciprocate along an axis of reciprocation; and an indexing pin attached to the indexing nut, wherein the indexing pin follows a profile of the first axial cam upon rotation of the indexing nut around the axis of rotation.

Examples of actuator assemblies according to this disclosure include actuator assemblies wherein the cam body is nestable within a hollow inner portion of a valve yoke.

Examples of actuator assemblies according to this disclosure include actuator assemblies wherein the first recess defining the first axial cam covers a rotational drive path of less than 180 degrees.

Examples of actuator assemblies according to this disclosure include actuator assemblies wherein the first recess defining the first axial cam covers a rotational drive path of less than 100 degrees.

Examples of actuator assemblies according to this disclosure include actuator assemblies wherein the first recess defining the first axial cam comprises a flat land disposed between a first indexing stop and a second indexing stop.

Examples of actuator assemblies according to this disclosure include actuator assemblies comprising an intermediate nut comprising a lower portion detachably connected to the indexing nut and an upper portion detachably connected to a drive screw, wherein the intermediate nut is rotatable along the axis of rotation and reciprocally along the axis of reciprocation; and a second indexing pin removably attached to an exterior surface of the intermediate nut, wherein the cam body further comprises a second recess defining a second axial cam.

Examples of actuator assemblies according to this disclosure include actuator assemblies comprising at least one locking bolt hole in the cam body.

Although the present disclosure has been described with various embodiments, various changes and modifications may be suggested to one skilled in the art. It is intended that the present disclosure encompass such changes and modifications as falling within the scope of the claims.

The present disclosure should not be read as implying that any particular element, step, or function is an essential element, step, or function that must be included in the scope of the claims. Moreover, the claims are not intended to invoke 35 U.S.C. § 112(f) unless the exact words "means for" are followed by a participle.

What is claimed is:

1. An apparatus comprising:
    a valve yoke comprising a hollow inner portion and an upper face;
    an adapter plate comprising a through-hole and a lower face, wherein the lower face provides an interface for connection to the upper face of the valve yoke;
    an actuator assembly having an exterior profile, wherein the actuator assembly is removably retained within the hollow inner portion; and
    a drive screw retained between the actuator assembly and the adapter plate, wherein the drive screw is rotatable within the through-hole along an axis of rotation, wherein the axis of rotation is parallel to an axis of reciprocation,
    wherein the actuator assembly comprises a first axial cam and a first indexing pin rotatably driven by the drive screw to follow the first axial cam, and
    wherein the drive screw comprises a key slot for engaging with a drive shaft, and the adapter plate further comprises a mount point for a motor driving the drive shaft.

2. The apparatus of claim 1, wherein the actuator assembly comprises:
    an indexing nut for retaining a valve plug, wherein the indexing nut is driven by the drive screw and rotatable along the axis of rotation and able to reciprocate along the axis of reciprocation; and
    a cam body retaining the indexing nut in an inner portion of the cam body, the cam body comprising a first recess defining the first axial cam,
    wherein the first indexing pin is removably attached to an exterior surface of the indexing nut.

3. The apparatus of claim 2, wherein the first recess defining the first axial cam covers a rotational drive path of less than 180 degrees.

4. The apparatus of claim 2, wherein the first recess defining the first axial cam covers a rotational drive path of less than 100 degrees.

5. The apparatus of claim 2, wherein the first recess defining the first axial cam comprises a flat land disposed between a first indexing stop and a second indexing stop.

6. The apparatus of claim 2, wherein the actuator assembly further comprises:
    an intermediate nut comprising a lower portion detachably connected to the indexing nut and an upper portion detachably connected to the drive screw, wherein the intermediate nut is rotatable along the axis of rotation and reciprocally along the axis of reciprocation; and a second indexing pin removably attached to an exterior surface of the intermediate nut,
wherein the cam body further comprises a second recess defining a second axial cam.

7. The apparatus of claim 2, wherein the valve yoke comprises a grease fitting, the grease fitting providing a closable passage through the valve yoke to the first recess defining the first axial cam.

8. The apparatus of claim 1, further comprising a thrust washer disposed between the drive screw and the actuator assembly.

9. The apparatus of claim 1, further comprising at least one locking bolt blocking the actuator assembly from rotating relative to the valve yoke.

10. An actuator assembly comprising:
a cam body comprising a hollow body with a cylindrical interior profile, and a first recess defining a first axial cam;
an indexing nut retained within the cam body, wherein the indexing nut comprises an inner portion proportioned to retain a valve plug, and wherein the indexing nut is rotatable along an axis of rotation of the valve plug and free to reciprocate along an axis of reciprocation;
an indexing pin attached to the indexing nut, wherein the indexing pin follows a profile of the first axial cam upon rotation of the indexing nut around the axis of rotation; and
an intermediate nut comprising a lower portion detachably connected to the indexing nut and an upper portion detachably connected to a drive screw, wherein the drive screw is retained between the actuator assembly and an adapter plate of an apparatus, the drive screw comprises a key slot for engaging with a drive shaft, and the adapter plate further comprises a mount point for a motor driving the drive shaft.

11. The actuator assembly of claim 10, wherein the cam body is nestable within a hollow inner portion of a valve yoke.

12. The actuator assembly of claim 10, wherein the first recess defining the first axial cam covers a rotational drive path of less than 180 degrees.

13. The actuator assembly of claim 10, wherein the first recess defining the first axial cam covers a rotational drive path of less than 100 degrees.

14. The actuator assembly of claim 10, wherein the first recess defining the first axial cam comprises a flat land disposed between a first indexing stop and a second indexing stop.

15. The actuator assembly of claim 10, wherein the intermediate nut is rotatable along the axis of rotation and reciprocally along the axis of reciprocation, and the actuator assembly further comprising:
a second indexing pin removably attached to an exterior surface of the intermediate nut,
wherein the cam body further comprises a second recess defining a second axial cam.

16. The actuator assembly of claim 10, further comprising at least one locking bolt hole in the cam body.

* * * * *